United States Patent [19]
Vitale

[11] 3,964,751
[45] June 22, 1976

[54] PHONOGRAPH CARTRIDGE REPLACEABLE STYLUS ASSEMBLY

[75] Inventor: Paul Vitale, West Babylon, N.Y.

[73] Assignee: Pickering & Company, Inc., Plainview, N.Y.

[22] Filed: July 31, 1975

[21] Appl. No.: 600,815

[52] U.S. Cl. .......................... 274/37; 179/100.41 M
[51] Int. Cl.² ............................................ G11B 3/02
[58] Field of Search .............. 274/37; 179/100.41 D, 179/100.41 M, 100.41 K

[56] References Cited
UNITED STATES PATENTS

| | | | |
|---|---|---|---|
| 3,060,281 | 10/1962 | Snepvangers | 179/100.41 K |
| 3,136,554 | 6/1964 | De Vries | 179/100.41 K |
| 3,146,319 | 8/1964 | Stanton | 179/100.41 K |
| 3,215,785 | 11/1965 | Cvetko et al. | 274/37 X |
| 3,356,795 | 12/1967 | Shaper | 179/100.41 K |
| 3,760,125 | 9/1973 | Lave | 274/37 X |

Primary Examiner—Richard E. Aegerter
Assistant Examiner—Charles E. Phillips
Attorney, Agent, or Firm—Kane, Dalsimer, Kane, Sullivan and Kurucz

[57] ABSTRACT

A phonograph cartridge replaceable stylus assembly is provided. The assembly comprises a housing having a nonmagnetic tube affixed thereto. The tube has a forward end and a rear end extending outwardly away from the housing. A nonmagnetic stylus arm extends through the tube forward end. A jeweled stylus is mounted to the front of the arm. The rear end of the arm passes through an elastomeric damper positioned within the tube. The damper serves as a universal pivot joint for the arm. The damper comprises a cylindrical member having a forward edge and a rear edge with one of the edges engaging the tube and the other edge being free of the tube. A magnetic member is positioned within the tube secured to the arm and adapted to move therewith in response to motion of the jeweled stylus and following the grooves of a record.

4 Claims, 2 Drawing Figures

FIG. 1
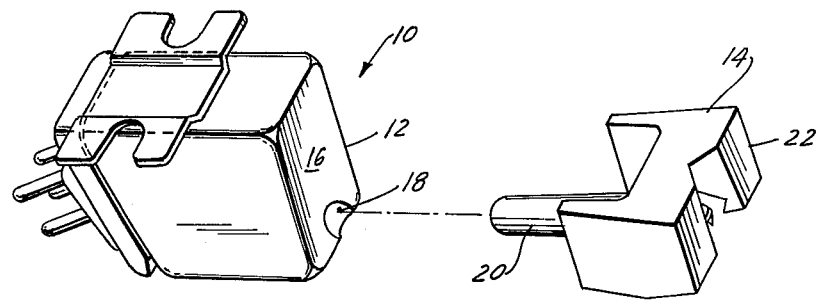
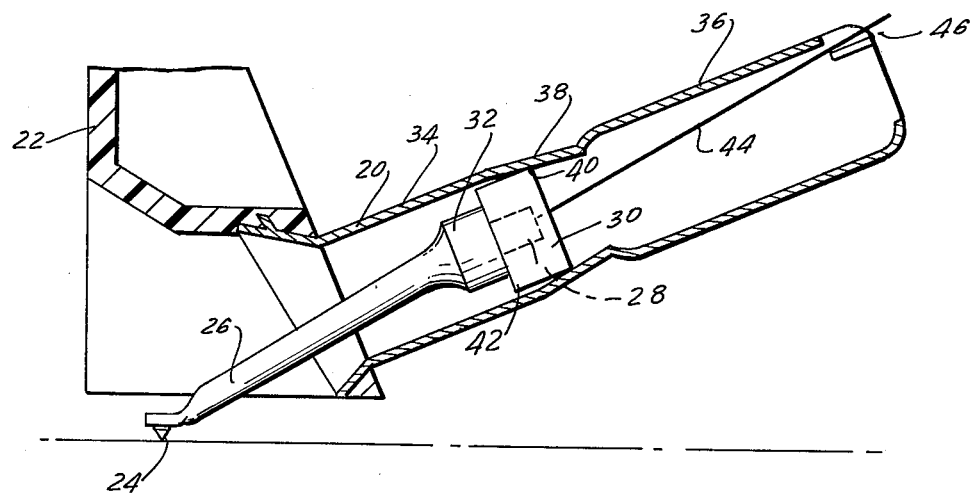
FIG. 2

PHONOGRAPH CARTRIDGE REPLACEABLE STYLUS ASSEMBLY

BACKGROUND OF THE INVENTION

The present invention relates to phonograph cartridges and more particularly to a replaceable stylus assembly for use in phonograph cartridges.

Phonograph pickup cartridges are generally either of the magnetic or ceramic type. Magnetic cartridges have recognized advantages in fidelity and response characteristics over ceramic cartridges and are widely used in quality high fidelity and stereophonic equipment.

In a magnetic cartridge, a jeweled stylus is used to track the grooves of a record disc. The stylus has attached to it a magnetic member which moves with the stylus within a magnetic circuit. The circuit includes portions about which a voltage generating coil is mounted so that flux variations in the circuit resulting from movement of the magnetic member are reflected in voltage changes at the output of the coils.

Heretofore, magnetic cartridges have been classified as being of either the moving magnet or moving iron type. In the former, typified by U.S. Pat. No. 3,297,831, a permanent magnet moves directly with the jeweled stylus. The latter construction is typified by U.S. Pat. No. 3,546,399 wherein a tubular armature of permeable material moves with the stylus. The armature is magnetically coupled to a fixed permanent magnet which thus serves as the flux source to the magnetic circuit through the armature. In either case, it is important that the magnetic member (i.e., permanent magnet in the first type of cartridge or permeable armature in the latter cartridge) move in faithful correspondence to the jeweled stylus.

Heretofore, it was common practice to support the armature within an elastomeric grommet which in turn was supported within a nonmagnetic tube. To support the grommet in position, the nonmagnetic tube was crimped over the grommet for substantially the entire length of the grommet. Ideally, the elastomeric grommet was to act as a universal joint for the armature. However, because of the nature of the support of the grommet within the nonmagnetic tube, the joint was not truly a universal joint and the mechanical impedance of the system was unduly high thus adversely affecting low frequency responses of such prior art devices.

In view of the above, it is the principal object of the present invention to provide an improved stylus assembly wherein the magnetic member is supported in such a manner as to provide low mechanical impedance so that the magnetic member freely moves in accurate correspondence to the motion of the stylus and thereby provides true and accurate response to variations in the record groove.

SUMMARY OF THE INVENTION

The above and other beneficial objects and advantages are attained in accordance with the present invention by providing an improved phonograph cartridge stylus assembly comprising a housing having a nonmagnetic tube affixed thereto. The tube has a forward end and a rear end extending outwardly away from the housing. A nonmagnetic stylus arm extends through the tube forward end. A jeweled stylus is mounted to the front of the arm. The rear end of the arm passes through an elastomeric damper positioned within the tube. The damper serves as a universal pivot joint for the arm. The damper comprises a cylindrical member having a forward edge and a rear edge with one of the edges engaging the tube and the other edge being free of the tube. A magnetic member is positioned within the tube secured to the arm and adapted to move therewith in response to motion of the jeweled stylus and following the grooves of a record.

BRIEF DESCRIPTION OF THE DRAWINGS

In the accompanying drawings:

FIG. 1 is a perspective view of a magnetic phonograph cartridge; and,

FIG. 2 is an enlarged, fragmentary side elevational sectional view of the cartridge stylus assembly.

DETAILED DESCRIPTION OF THE PREFERRED EMBODIMENT

Reference is now made to the associated drawings wherein the present invention is depicted. In FIG. 1 phonograph cartridge 10 is shown. Cartridge 10 comprises a cartridge body 12 and a removable replaceable moving system in the form of stylus assembly 14. Cartridge body 12 contains therein a transducer system which responds electrically and magnetically to the motion of the stylus assembly magnetic member to produce a monophonic, stereophonic or quadraphonic output. The details of the transducer system are immaterial for purposes of the present invention. Suffice it to say, the circuit may be of the type typified in either of the previously referred to U.S. Pat. Nos. 3,297,831 and 3,546,399 or a comparable circuit.

The forward face 16 of the cartridge body contains an opening 18 therein adapted to receive a tube 20 of the moving system. To this end, stylus assembly housing 22 is provided with flanges to engage the side of the cartrdige body and thereby insure the proper alignment of the stylus assembly with the components contained within the cartridge.

As shown in FIG. 2, tube 20 is secured to the stylus assembly housing 22 and extends outwardly therefrom. Tube 20 is formed of a nonmagnetic material, such as brass, and serves to contain therein a magnetic member which oscillates within the magnetic circuits of the cartridge in response to variations in the groove of a record disc. To this end, the stylus assembly includes a jeweled stylus 24 designed to ride in and track the record groove. Jewel 24 is mounted to the forward arm of a nonmagnetic stylus arm 26 which extends from the jewel into tube 20 as shown. The rear end 28 of the stylus arm is supported within an elastomeric grommet 30 to permit generally universal movement. The grommet is formed of rubber or the like which yields sufficiently to permit substantially free movement of the arm.

In addition to serving as a universal joint for the stylus arm, grommet 30 provides a mechanical damper for the stylus arm. It is desirable that the mechanical impedance of the damper be as low as possible so that the magnetic member 32 which is mounted to arm 26 and moves therewith will accurately follow the movement of the stylus. In a successful practice of this invention, magnetic member 32 comprised a samarium cobalt permanent magnet.

In accordance with the present invention, the low mechanical impedance of grommet 30 is attained by having the damper engage tube 20 only along a single peripheral edge. The remainder of the damper is free of the tube and thus permitted to move. Thus, as shown in FIG. 2, tube 20 includes a forward section 34, a rear section 36 and a tapered intermediate section 38. Grommet 30 is positioned within the intermediate section. Since the taper of section 30 extends rearwardly, when the rear edge 40 of grommet 30 engages the tube, the forward edge 42 of the grommet is free.

In order to insure the proper relative position of the grommet within the tube a tie wire 44 extends rearwardly and upwardly from the back of stylus arm 26. The end of the wire passes through a slit 46 in the rear of the tube and is soldered in place. As a result of the upward force directed at the rear of the stylus arm, the forward end of the stylus arm containing the stylus jewel 24 is directed downwardly to better engage a record disc. By varying the tension on wire 44, the degree of penetration of the damper into the tapered section of the tube may be altered thus varying the damping characteristics.

It should be emphasized that while the above description relates to a moving magnet stylus assembly (i.e., magnetic member 32 is a permanent magnet) the present construction would apply equally to a moving iron stylus. In this case, the magnetic member would be formed of a permeable material and a suitable permanent magnet would have to be provided to magnetize the magnetic member. Thus, in accordance with the above, the aforementioned object is effectively attained.

Having thus described the invention, what is claimed is:

1. A phonograph cartridge stylus assembly comprising: a housing; a nonmagnetic tube affixed to said housing, said tube having a forward end, a rear end extending outwardly away from said housing; a forward section extending rearwardly from said end, a rear section extending forwardly from said rear end, and an intermediate section interposed between said forward and rear sections and said intermediate section tapers rearwardly and radially inwardly; a nonmagnetic stylus arm extending through said tube forward end, said arm having a forward end outside said housing and a rear end within said tube; a stylus tip mounted to said arm forward end; and elastomeric damper positioned within said tube supporting said arm rear end, said damper comprising a cylindrical member having a forward edge and a rear edge and only said damper rear edge engages said tube tapered section the other of said edges being free of said tube; and a magnetic member positioned within said tube secured to said arm and adapted to move therewith.

2. The stylus assembly in accordance with claim 1 wherein said magnetic member is disposed immediately in front of said damper.

3. The stylus assembly in accordance with claim 1 further comprising a wire extending through said tube rearwardly from said arm, said wire having a first end attached to said tube and a second end attached to said arm rear end whereby to apply a tensile load onto said arm.

4. The stylus assembly in accordance with claim 1 wherein said wire extends rearwardly and upwardly whereby to direct said arm forward end downwardly.

* * * * *